(12) United States Patent
Grokop

(10) Patent No.: US 9,516,360 B2
(45) Date of Patent: Dec. 6, 2016

(54) ESTIMATING DEMOGRAPHIC STATISTICS OF MEDIA VIEWERSHIP VIA CONTEXT AWARE MOBILE DEVICES

(75) Inventor: Leonard Henry Grokop, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 176 days.

(21) Appl. No.: 13/445,348

(22) Filed: Apr. 12, 2012

(65) Prior Publication Data

US 2013/0273941 A1    Oct. 17, 2013

(51) Int. Cl.
| H04N 21/24 | (2011.01) |
| H04N 21/2187 | (2011.01) |
| H04N 21/25 | (2011.01) |
| H04N 21/258 | (2011.01) |
| H04N 21/414 | (2011.01) |
| H04N 21/422 | (2011.01) |
| H04N 21/4223 | (2011.01) |
| H04N 21/466 | (2011.01) |
| H04N 21/658 | (2011.01) |
| H04L 29/08 | (2006.01) |
| H04W 4/02 | (2009.01) |
| H04W 4/20 | (2009.01) |

(52) U.S. Cl.
CPC .............. *H04N 21/24* (2013.01); *H04L 67/22* (2013.01); *H04L 67/306* (2013.01); *H04N 21/2187* (2013.01); *H04N 21/252* (2013.01); *H04N 21/25883* (2013.01); *H04N 21/41407* (2013.01); *H04N 21/4223* (2013.01); *H04N 21/42202* (2013.01); *H04N 21/42203* (2013.01); *H04N 21/466* (2013.01); *H04N 21/6582* (2013.01); *H04W 4/021* (2013.01); *H04W 4/028* (2013.01); *H04W 4/206* (2013.01)

(58) Field of Classification Search
CPC ........ H04H 60/46; H04H 60/56; H04H 60/58; H04H 60/59; H04H 60/61; H04N 21/24; H04N 21/466; H04N 21/42203; H04N 21/41407; H04N 21/6582; H04N 21/4223; H04N 21/2187; H04N 21/42202; H04N 21/25883; H04N 21/252; H04W 4/206; H04W 4/021; H04W 4/028; H04L 67/306; H04L 67/22
USPC .............................. 455/456.3, 2.01; 705/7.32
See application file for complete search history.

(56) References Cited

U.S. PATENT DOCUMENTS

| 7,809,805 B2 | 10/2010 | Stremel et al. |
| 2002/0111172 A1 | 8/2002 | DeWolf et al. |

(Continued)

OTHER PUBLICATIONS

International Search Report and Written Opinion—PCT/US13/35898—ISA/EPO—Apr. 15, 2014.

(Continued)

*Primary Examiner* — Marcos Torres
(74) *Attorney, Agent, or Firm* — Kilpatrick Townsend & Stockton LLP

(57) ABSTRACT

A method of generating demographic statistics related to an event includes using sensor data acquired at a mobile device to estimate a value for a category of a demographic model of a user of the mobile device; using sensor data acquired at the mobile device to detect an occurrence of the event in which the user of the mobile device participates; and associating the estimated value for the category of the demographic model of the user of the mobile device with the event.

40 Claims, 5 Drawing Sheets

(56) References Cited

U.S. PATENT DOCUMENTS

| | | | |
|---|---|---|---|
| 2004/0259536 A1 | 12/2004 | Keskar et al. | |
| 2007/0143348 A1 | 6/2007 | Rosenberg | |
| 2007/0143778 A1* | 6/2007 | Covell et al. | 725/19 |
| 2008/0192988 A1 | 8/2008 | Uludag et al. | |
| 2009/0070104 A1* | 3/2009 | Jones et al. | 704/211 |
| 2009/0106084 A1 | 4/2009 | Or | |
| 2010/0004997 A1 | 1/2010 | Mehta et al. | |
| 2010/0203876 A1 | 8/2010 | Krishnaswamy | |
| 2010/0228632 A1* | 9/2010 | Rodriguez | 705/14.66 |
| 2010/0242061 A1 | 9/2010 | Levitan | |
| 2011/0019001 A1 | 1/2011 | Rhoads et al. | |
| 2011/0022312 A1 | 1/2011 | McDonough et al. | |
| 2011/0053559 A1* | 3/2011 | Klein | 455/411 |
| 2011/0258049 A1 | 10/2011 | Ramer et al. | |
| 2011/0264599 A1 | 10/2011 | Dalton | |
| 2011/0283319 A1 | 11/2011 | Davis et al. | |
| 2011/0283329 A1* | 11/2011 | Davis et al. | 725/62 |
| 2012/0059848 A1* | 3/2012 | Krishnamoorthy | 707/770 |
| 2013/0145390 A1* | 6/2013 | Sillerman | 725/18 |

OTHER PUBLICATIONS

Supplementary European Search Report—EP13717149—Search Authority—Munich—Oct. 5, 2015.

* cited by examiner

ESTIMATING DEMOGRAPHIC STATISTICS OF MEDIA VIEWERSHIP VIA CONTEXT AWARE MOBILE DEVICES

BACKGROUND

Mobile devices are incredibly widespread in today's society. For example, people use cellular phones, smart phones, personal digital assistants, laptop computers, pagers, tablet computers, etc. to send and receive data wirelessly from countless locations. Moreover, advancements in wireless communication technology have greatly increased the versatility of today's wireless communication devices, enabling users to perform a wide range of tasks from a single, portable device that conventionally required either multiple devices or larger, non-portable equipment.

Mobile devices can be configured for context awareness, which allows the mobile device to be able to determine a current situation surrounding a user of the mobile device. For example, a mobile device can be aware of the present location of the user, the surrounding environment of the mobile device, the present activities of the user, the people that are presently with the user, etc. Many on-board sensors can provide the raw data from which higher level contextual inferences can ultimately be made.

Event organizers or content providers often try to gather statistics on their consumers, such as viewers of a broadcast television program, listeners of a broadcast radio program, participants or spectators of events (e.g., concerts, sporting competitions, rallies, lectures, etc.). Estimating the number of these consumers is currently a difficult and expensive task. Producing accurate estimates of demographics (e.g., age, gender, race, and location) is more difficult still. A common solution adopted by television rating agencies, such as Nielsen, is to gather statistics from a small paid subset of the population using electronic meters. Other solutions involve manual annotation, for example, police crowd counting, or volunteer surveying. High costs and low accuracy aside, there are many shortcomings of such approaches. For instance, current television rating systems suffer from an inability to generate event viewership statistics outside the home environment, difficulties in determining which family member or home resident is watching or listening at a given time, and the inability to collect statistics on non-broadcast viewing or listening (e.g., internet viewing, viewing via set-top boxes, listening via streaming or stored audio).

SUMMARY

An example of a method of generating demographic statistics related to an event according to the disclosure includes using sensor data acquired at a mobile device to estimate a value for a category of a demographic model of a user of the mobile device; using sensor data acquired at the mobile device to detect an occurrence of the event in which the user of the mobile device participates; and associating the estimated value for the category of the demographic model of the user of the mobile device with the event.

Embodiments of such a method may include one or more of the following features. The event includes consuming a media program. The media program is a television program. The event includes attending or participating in a live gathering of participants. The event includes being present at a geographic location. The occurrence of the event is detected using sensor data from one or more of a microphone, a GPS receiver, an accelerometer, a light sensor, a magnetometer, a gyroscope, a proximity sensor, a camera, a barometric pressure sensor, a temperature sensor, a capacitive touch sensor, a Wi-Fi detector, and a Bluetooth® detector. At least one of estimation of the value and detection of the occurrence of the event also uses user content data including usage information from one or more of email content, calendar content, SMS text message content, social networks, and a contact list. The demographic model includes one or more of the following categories: age, gender, race, location, occupation, income, activity level, commute information, height, languages spoken, locations visited, and environments encountered. Using sensor data to estimate the value for the category of the demographic model of the user of the mobile device further includes assigning a confidence measure to the estimated value for the category. The method further includes updating an estimate of a value for a category of the demographic model based at least in part on detecting the occurrence of the event. The method is performed at a server in communication with the mobile device.

An example of a system for generating demographic statistics related to an event includes a mobile device configured to: collect sensor data available at the mobile device; use at least some of the sensor data to estimate a value for a category of a demographic model of a user of the mobile device; transmit the estimated value for the category of the demographic model of the user to a server; use at least some of the sensor data to detect an occurrence of the event in which the user of the mobile device participates; and transmit information about the occurrence of the event to the server; and the server configured to: receive the estimated value for the category of the demographic model of the user from the mobile device; receive the information about the occurrence of the event from the mobile device; and associate the estimated value for the category of the demographic model of the user, with the event, using the information about the occurrence of the event.

Embodiments of such a system may include one or more of the following features. The event includes consuming a media program. The media program is a television program. The event includes attending or participating in a live gathering of participants. The event includes being present at a geographic location. The mobile device is configured to collect the sensor data as sensor data from one or more of a microphone, a GPS receiver, an accelerometer, a light sensor, a magnetometer, a gyroscope, a proximity sensor, a camera, a barometric pressure sensor, a temperature sensor, a capacitive touch sensor, a Wi-Fi detector, and a Bluetooth® detector. The mobile device is configured to collect user content data including usage information from one or more of email content, calendar content, SMS text message content, social networks, and a contact list; and at least one of estimation of the value and detection of the occurrence of the event also uses the user content data. The demographic model includes one or more of the following categories: age, gender, race, location, occupation, income, activity level, commute information, height, languages spoken, locations visited, and environments encountered. The mobile device is further configured to assign a confidence measure to the estimated value for the category. The mobile device is further configured to update an estimate of a value for a category of the demographic model based at least in part on detecting the occurrence of the event.

An example of a mobile device includes one or more sensors configured to collect sensor data; a processor communicatively coupled to the one or more sensors and configured to use at least some of the sensor data collected to estimate a value for a category of a demographic model of a user of the mobile device, and to use at least some of the sensor data to detect an occurrence of an event in which the user of the mobile device participates; and a transceiver communicatively coupled to the processor and configured to transmit the estimated value for the category of the demographic model of the user, and to transmit information about the occurrence of the event.

Embodiments of such a mobile device may include one or more of the following features. The processor is further configured to process at least some of the sensor data to generate features associated with the event; the transceiver is further configured to transmit the features associated with the event, and to receive information about multiple possible pre-determined target events; and the processor is configured to detect the occurrence of the event in which the user of the mobile device participates by comparing the features associated with the event with the information about the multiple possible pre-determined target events. The event includes consuming a media program; the one or more sensors include a microphone; and the features associated with the event are generated as features of an audio waveform of the media program collected using the microphone. Collecting the sensor data, estimating the value for the category, or detecting the occurrence of the event occurs periodically, sporadically, or opportunistically. The one or more sensors include one or more of a microphone, a GPS receiver, an accelerometer, a light sensor, a magnetometer, a gyroscope, a proximity sensor, a camera, a barometric pressure sensor, a temperature sensor, a capacitive touch sensor, a Wi-Fi detector, and a Bluetooth® detector. The mobile device further includes one or more applications configured to provide user content data including usage information about the user of the mobile device for use in at least one of estimating the value and detecting the occurrence of the event.

An example of a server for utilizing a data network to generate demographic statistics related to an event includes a communication interface communicatively coupled with the data network and configured to receive, from a mobile device, an estimated value for a category of a demographic model of a user of the mobile device, and to receive, from the mobile device, features associated with the event in which the user of the mobile device participates; and a processor communicatively coupled with the communication interface and configured to detect an occurrence of the event by comparing the features associated with the event with information about multiple pre-determined target events, and to associate the estimated value for the category of the demographic model of the user of the mobile device with the event, wherein the value for the category of the demographic model of the user of the mobile device was estimated using sensor data available at the mobile device, and wherein the features associated with the event were generated by processing sensor data available at the mobile device.

Embodiments of such a server may include one or more of the following features. The server further includes a storage medium communicatively coupled with the processor and configured to store the information about the multiple pre-determined target events. The processor is further configured to associate with the event estimated values for categories of demographic models of users of other mobile devices who participate in the event. The communication interface is further configured to receive information about the occurrence of the event from the mobile device; and the processor is configured to use the information about the occurrence of the event to associate the estimated value for the category of the demographic model of the user of the mobile device with the event. The communication interface is further configured to transmit the information about the multiple pre-determined target events to the mobile device to assist the mobile device in detecting the occurrence of the event.

An example of a computer program product residing on a non-transitory processor-readable medium includes processor-readable instructions configured to cause a processor to: access an estimated value for a category of a demographic model of a user of a mobile device; access features associated with an event in which the user of the mobile device participates; retrieve from storage information about multiple pre-determined target events; detect an occurrence of the event by comparing the features associated with the event with the information about the multiple pre-determined target events; and associate the estimated value for the category of the demographic model of the user of the mobile device with the event, wherein the value for the category of the demographic model of the user of the mobile device was estimated using sensor data available at the mobile device, and wherein the features associated with the event were generated by processing sensor data available at the mobile device.

Embodiments of such a computer program product may include one or more of the following features. The processor-readable instructions are further configured to cause the processor to associate with the event estimated values for categories of demographic models of users of other mobile devices who participate in the event. The processor-readable instructions are further configured to cause the processor to access information about the occurrence of the event from the mobile device, the information about the occurrence of the event used to associate the estimated value with the event. The processor-readable instructions are further configured to cause the processor to provide to the mobile device the information about the multiple pre-determined target events to assist the mobile device in detecting the occurrence of the event.

An example of an apparatus for generating demographic statistics related to an event includes means for receiving an estimated value for a category of a demographic model of a user of a mobile device, and for receiving features associated with the event in which the user of the mobile device participates; and means for processing to detect an occurrence of the event by comparing the features associated with the event with information about multiple pre-determined target events, and to associate the estimated value for the category of the demographic model of the user of the mobile device with the event, wherein the value for the category of the demographic model of the user of the mobile device was estimated using sensor data available at the mobile device, and wherein the features associated with the event were generated by processing sensor data available at the mobile device.

Embodiments of such an apparatus may include one or more of the following features. The apparatus further includes means for storing the information about the multiple pre-determined target events. The means for processing are further to associate with the event estimated values for categories of demographic models of users of other mobile devices who participate in the event. The means for receiving are further for receiving information about the occurrence of the event from the mobile device; and the means for processing are further to use the information about the occurrence of the event to associate the estimated value with the event. The apparatus further includes means for transmitting the information about the multiple pre-determined target events to the mobile device to assist the mobile device in detecting the occurrence of the event.

Items and/or techniques described herein may provide one or more of the following capabilities. A wide range of data mining applications can benefit from the described techniques. For example, rating agencies would be able to collect demographic statistics of media viewership in a wider variety of viewing environments, with more detail and with greater accuracy, at a fraction of the cost of current methods. This information would be of great value to media organizations, marketing and advertising agencies, etc., that wish to access the level of traction certain programs have with different demographic groups. It also would be of high value to a number of other organizations, such as promotional organizations, sales and distribution, and city planners. For instance, the described techniques could be used to collect demographic statistics for viewership of a broadcast television program, a streamed internet video, a rock-concert audience, listenership of a radio show, attendance at a sporting event, customers visiting a particular shopping center or a particular store, attendance at a protest rally, or collecting census information, among other possibilities. While item/technique-effect pairs have been described, it may be possible for a noted effect to be achieved by means other than those noted, and a noted item/technique may not necessarily yield the noted effect.

DETAILED DESCRIPTION

Figure 1:
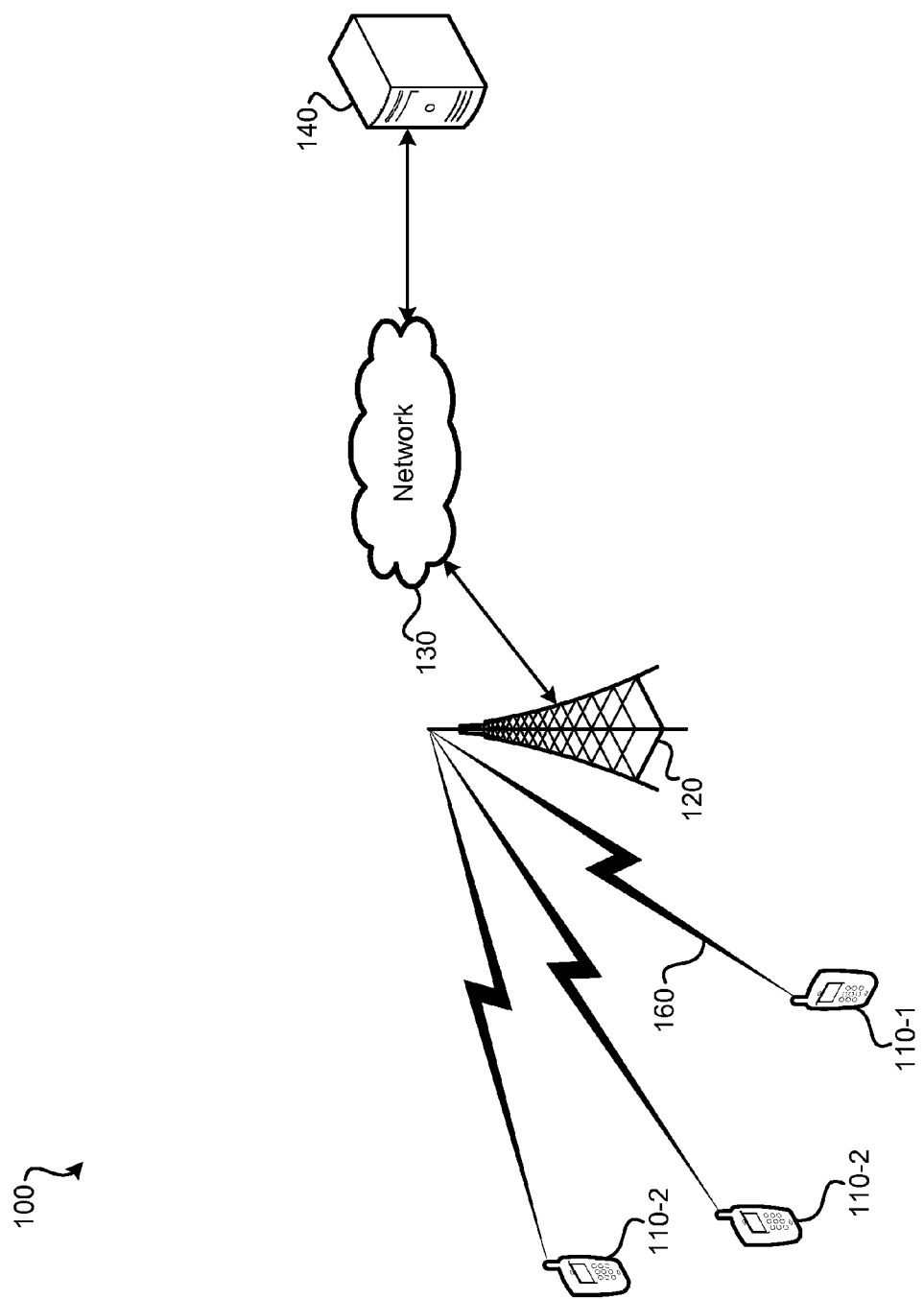
FIG. 1 is a simplified diagram of a context aware system.

The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

Techniques described herein provide mechanisms for generating demographic statistics related to events using context aware mobile devices. Sensor data available at a context aware mobile device are used to estimate a value for a category of a demographic model of the user of the mobile device and to detect an occurrence of an event in which the user of the mobile device participates. The estimated value for the category of the demographic model of the user is associated with the event in which the user participates. The demographic model includes categories (e.g., age, gender, race, location) the values for which are estimated using sensor data (e.g., data from a microphone, a global positioning system (GPS) receiver, an accelerometer, or a light sensor). This sensor data is also used to detect an occurrence of an event, which can include, for example, a media program (e.g., a television program or a radio program), a live event (e.g., a concert, a rally, a sporting event), and a visit to a geographic location (e.g., a coffee shop or a shopping center). In some embodiments, estimation of the value and/or detection of the occurrence of the event can also use user content data (e.g., usage information extracted or inferred from email content, calendar content, or Short Message Service (SMS) text message content).

Context Aware Systems

Configurations where data are collected from a mobile device to determine the context (i.e., activity, environment, location, etc.) of the user of a mobile device may be referred to as context aware systems. Some mobile devices utilize contextual inferences to provide additional functionality to the user of the mobile device by adapting dynamically to the current situation surrounding the user. For example, if a mobile device can detect that the user of the mobile device is a frequent spectator of professional baseball games and is presently attending a particular game, the mobile device can be configured to provide content targeted specifically for spectators of the particular game (e.g., upcoming game schedules, advertisements, discounts, etc.).

FIG. 1 illustrates a context aware system 100. The context aware system 100 includes mobile devices 110, a base station 120, a network 130, and a context assistance server 140. The mobile devices 110 can include mobile phones, tablet computers, personal digital assistants, or other wireless devices, which can communicate with the base station 120 using a wireless cellular connection 160. The wireless cellular connection 160 can include 2G, 3G, and/or 4G protocol, such as LTE (Long Term Evolution).

The base station 120 can be in communication with the network 130. The network 130 can be one or more public and/or private data networks, such as the mobile carrier network, a local area network (LAN), and/or a wide area network (WAN) (e.g., the Internet). The context assistance server 140, which can comprise one or more computing devices, can be in communication with the network 130. Thus, information can be communicated between the mobile devices 110 and the context assistance server 140 via the base station 120 and the network 130.

The context aware system 100 can utilize the context assistance server 140 to help facilitate determining the context of users of the mobile devices 110. For example, a first mobile device 110-1 can use sensor data available to it to estimate a value for a category of a demographic model of a user of the first mobile device 110-1. The first mobile device 110-1 can then communicate to the context assistance server 140 the estimated value for the category of the demographic model of the user. The first mobile device 110-1 or the context assistance server 140 can utilize the same sensor data and/or different sensor data to detect an occurrence of an event in which the user of the first mobile device 110-1 participates. The context assistance server 140 can then associate the estimated value for the category of the demographic model of the user of the first mobile device 110-1 with the event. As described in further detail below, sensor data from other mobile devices 110-2 also can be used by the context assistance server 140 to associate estimated values for categories of the demographic models of users of those mobile devices 110-2 with the same event. Over time, the context aware system 100 can generate demographic statistics related to the event by gathering associated estimated values for categories of the demographic models of those users who participated in the event.

The sensor data available at a mobile device 110 can vary, depending on the functionality of the mobile device 110. For instance, a mobile device 110 may be equipped with a GPS receiver, in which case the mobile device 110 can provide sensor data as location information such as latitude, longitude, and elevation. Location information provided at multiple points in time can also be used to determine a direction and/or speed of travel. Additionally or alternatively, the mobile device 110 can include sensors such as accelerometers, gyroscopes, and other orientation and/or movement sensors, which can be useful in gathering sensor data for determining certain activities that can be associated with certain movements (e.g., running, walking, sitting, etc.). In fact, the mobile devices 110 can include a variety of sensors capable of producing sensor data that can be used for context awareness. These sensors include, but are not limited to, microphones, cameras, proximity sensors, light sensors, magnetometers, temperature sensors, barometric pressure sensors, capacitive touch sensors, etc. Furthermore, the mobile devices 110 may be communicatively coupled with additional sensors via wireless (e.g., Bluetooth®, IEEE 802.11, etc.) and/or wired connections that can provide additional information for a context determination. Alternatively or in addition, the mobile device 110 may be equipped to provide user content data including usage information from one or more functions or applications, such as content from emails, calendar entries, SMS text messages, social networks, and contact lists, which can be used with sensor data to estimate a value for a category of a demographic model and/or to detect an occurrence of an event.

Generating Demographic Statistics Related to an Event

Figure 2:
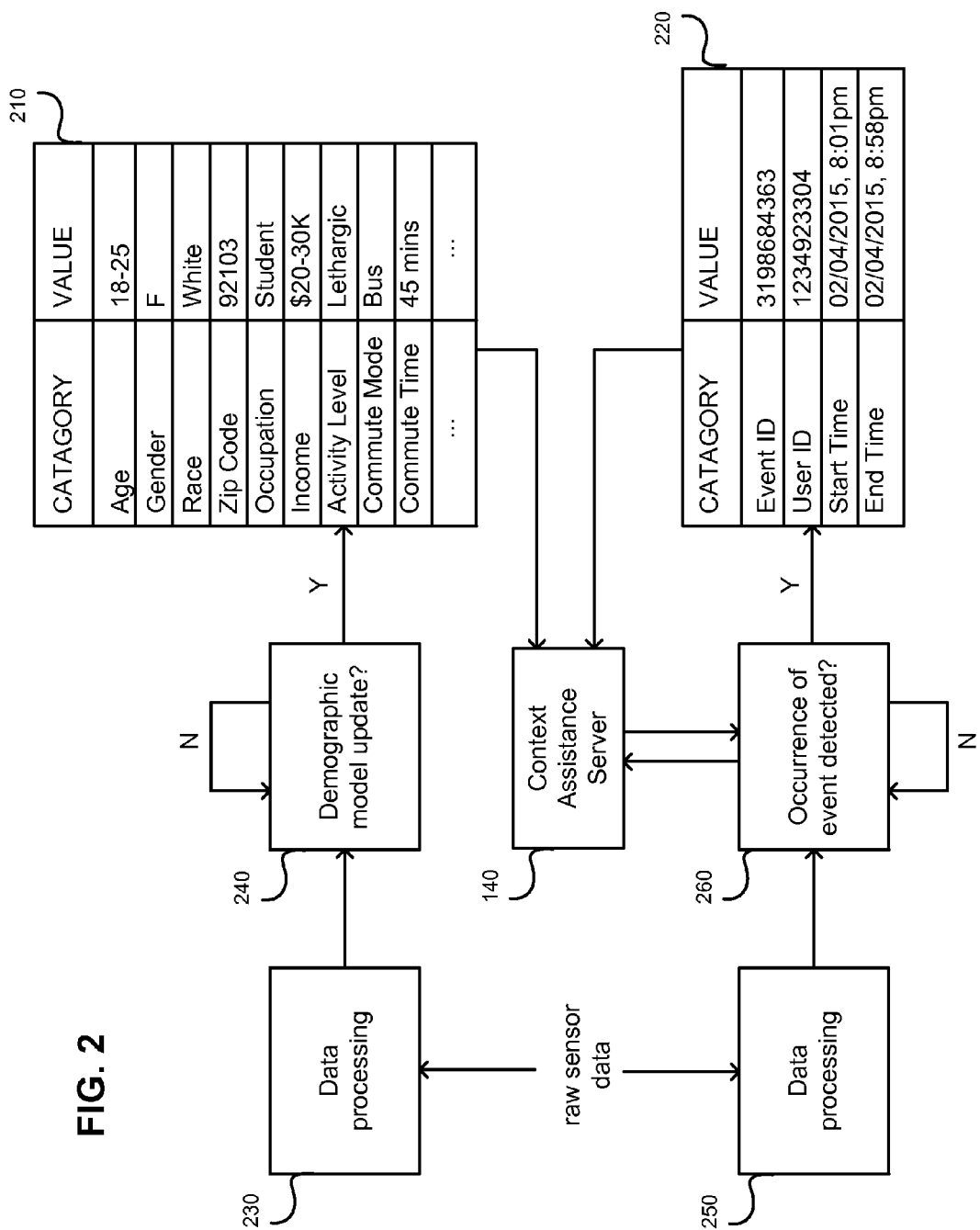
FIG. 2 is a simplified diagram of how the context aware system of FIG. 1 can generate demographic statistics related to an event using sensor data available at context aware mobile devices.

With the sensor data available at one or more mobile devices 110, the context aware system 100 can generate demographic statistics related to events by gathering estimated values for categories of demographic models of users of the one or more mobile devices 110 who participate in the events. FIG. 2 is a simplified diagram 200 of how the context aware system 100 of FIG. 1 can generate demographic statistics related to an event using sensor data available at mobile devices 110 that are context aware. Hereinafter, the mobile devices 110 described will be context aware mobile devices unless otherwise specified.

Generally, demographic statistics are obtained via the mobile devices 110 by populating a demographic model for each user of a mobile device 110 and transparently reporting to a context assistance server 140: (1) periodic updates of one or more estimated values for categories of the user's demographic model; and (2) the occurrence of events in which each user participates.

An example of a user's demographic model is shown in table 210 of FIG. 2. The example demographic model includes categories that describe the user. Values for these categories can be populated by processing raw sensor data available at the mobile device 110 of the user. The example demographic model of table 210 includes the categories of age, gender, race, zip code, occupation, income, activity level, commute mode, and commute time. The corresponding values for this particular user are also illustrated to the right of the categories in table 210.

The categories of the example demographic model shown in table 210 are illustrative and are not necessary or limiting. Any combination of less, the same number, or more of the same and/or different categories is possible in different implementations. For example, in a simple model, the categories may just include age and gender. A more detailed model may have more categories, such as height, languages spoken, home location (e.g., zip code or area code), work location, etc. A further detailed model may have categories such as locations visited, situations or environments encountered, activity level, colleagues, commute mode, commute time, etc.

Locations visited can be divided into multiple categories. For example, the categories can be a list of locations the user visits, where the corresponding value for each category can be the average number of hours per time period (e.g., per month) spent in each location. Example locations can include office, home, specific restaurants, specific cafes, specific stores, etc. In some implementations, instead of providing a number (e.g., the average number of hours per time period) as the value for a category, the value can be provided as a range (e.g., under 10 hours, over 50 hours, etc.) or as a descriptor (e.g., rarely, frequently, etc.).

Situations or environments encountered can be divided into multiple categories. For example, the categories can be a list of environments the user experiences, where the corresponding value for each category can be the average number of hours per time period (e.g., per month) spent in each environment. Example categories for environments can include working categories (e.g., in office, at home, in meeting, presenting, etc.), home categories (e.g., asleep, awake but inactive, active but alone, active and interacting with others, watching television, etc.), a category for eating, a category for working out at the gym, etc. A category for activity level can have as a value the average number of hours the user spends walking and/or running per time period (e.g., per week). Alternatively, as in table 210, the value can be provided as a descriptor (e.g., lethargic, iron man, etc.). Categories for colleagues may include a list of other people with whom the user interacts, where the corresponding value for each category can be the average number of hours of interaction time per time period. Categories for colleagues may instead include a list of the type of interaction (e.g., family, work, different social groups, etc.).

Updating Demographic Model

Demographic information may be gathered using any combination of sensors inputs on the mobile device 110. Sensor data can be collected from sensors or other components of the mobile device 110, such as a microphone, a GPS receiver, an accelerometer, a light sensor, etc. As an example, microphone data can facilitate the estimation of values for categories such as age, gender, race, height, and languages spoken.

A user's location obtained from GPS or Wi-Fi data can provide demographic information about the user's wealth, race, age, etc. For example, if the location corresponds to a retirement village, the age is likely to be greater than 65 years old. Conversely, if the location corresponds to a trendy, social, urban neighborhood, the age is likely to fall in the age group of 20-40 year olds. Another example is if the location corresponds to an area predominantly populated by a particular ethnic group.

The accelerometer can be used to determine how physically active the user is. Some examples of how this information may be used include determining if certain television programs are being viewed by active and/or inactive users, and assessing the level of activity among customers frequenting fast food restaurants.

The light sensor can be used to determine how much time the user spends indoors and/or outdoors, which may also be relevant to categories such as activity level.

More generally, user content data comprising usage information can also be incorporated. Examples of this user content data include content from email, SMS text message, calendar entries, social network information, contact list information, usage statistics for the mobile device 110, etc. For instance, the style of language used in constructing emails or SMS text messages may be an indication of age, gender, race, wealth, interests, etc.

In some implementations, confidence measures can be assigned to values estimated for categories of the demographic model. These confidence measures can be expressed as levels (e.g., high, medium, low), probabilities, etc. These confidence measures represent the level of surety in the values. For example, if the result of running a gender estimation algorithm determines that a user is female but a metric of accuracy in the determination is not high due to insufficient data available, a low level of confidence can be associated with the estimated value for the gender category of the user's demographic model.

In some implementations, to reduce power consumption of the mobile device 110 for example, raw sensor data used in estimating a value for a category of the demographic model may be gathered periodically (e.g., for 5 seconds every 15 minutes), sporadically (e.g., at random time intervals), or opportunistically (e.g., when motion is detected, when a Wi-Fi fingerprint has changed, when the user is on a call, when certain types of audio are detected, etc.), as opposed to continuously. Likewise, the data processing of the raw sensor data (i.e., shown as the block 230 of FIG. 2) can also occur only at periodic, sporadic, or opportune times. For example, the accelerometer data can run through a motion classifier only when motion is detected. If walking or running is then identified, the value for the user activity level can be updated in the demographic model.

At appropriate times (e.g., during the night, while charging the mobile device 110), either the entire demographic model, or an update of the demographic model, can be uploaded (e.g., through a wire or wirelessly) to the context assistance server 140. This is illustrated in FIG. 2 in the decision block 240 for demographic model update.

Reporting an Occurrence of an Event

As used in this specification, the term "event" can mean any pre-determined target action the user of the mobile device 110 might undertake. Examples of events include the user watching a particular television show, listening to a particular radio show, listening to a particular song, shopping in a particular store, eating in a particular restaurant, attending a particular sporting event, attending a particular rock concert, attending a particular town-hall meeting, participating in a particular rally, participating in a particular organized group activity (e.g., running in a marathon), being present at a particular locale (e.g., a street intersection, zip code, or city.), etc.

Sensor inputs, raw or processed, may be used to detect an occurrence of an event. The following are some examples of detecting an occurrence of an event using sensor inputs: the microphone can be used to detect that the user is consuming a media program (e.g., listening to a particular radio program, watching a particular television program); the GPS and/or Wi-Fi scans can be used to detect that the user is present at a football game; a combination of data from the GPS receiver and the accelerometer can be used to detect that the user is running a particular marathon, or riding in a particular charity bike race. Data processing of the raw sensor data for detecting an occurrence of an event is illustrated in the block 250 of FIG. 2.

When an occurrence of an event is detected, information is reported to the context assistance server 140, for example, by the mobile device 110. Detecting an occurrence of an event is illustrated in the decision block 260 of FIG. 2. The example table 220 of FIG. 2 illustrates four categories of information that can be reported to the context assistance server 140: an event ID, a user ID, a start time, and an end time. The categories of information that can be reported, as shown in the table 220, are illustrative and are not necessary or limiting. Other combinations of less, the same number, or more of the same and/or different categories of information are possible in different implementations. In some implementations, the categories of information can be reported to the context assistance server 140 at different times. In some implementations, one or more of the categories of information are determined by, and are not reported to, the context assistance server 140.

The reporting of an occurrence of an event may be via wireless upload over a cellular network, a Wi-Fi network, or by other means. The event ID, shown in the example table 220, characterizes the specific pre-determined target event in which the user of the mobile device 110 participates. For example, the event of watching a particular television show might be associated with ID #41239980213, the event of shopping at a particular clothing store might be associated with ID #23020863477. The user ID, shown in the example table 220, characterizes the mobile device 110. For example, the user ID could simply be an identifier of the mobile device 110, or an encrypted version of an identifier of the mobile device 110. The start time and end time of the event, shown in the example table 220, correspond to the time and/or date that the occurrence of the event was detected. For example, if a user of a mobile device 110 is determined to have attended a particular baseball game, the report of the occurrence of the event can include an identifier of the baseball game, an identifier of the user, the time that the user arrived at the game, and the time that the user left the game.

The report of the occurrence of the event can be sent immediately after the end of the occurrence of the event has been detected, or at any later time. The report can also be sent during the occurrence of the event, in which case the end time is not included in that report, but is instead reported later.

In some implementations, to assist in detecting an occurrence of an event, the mobile device 110 can communicate (e.g., through a wire or wirelessly) with the context assistance server 140, which has access to a database of stored event information. In these implementations, the mobile device 110 can upload either raw or processed sensor data to the context assistance server 140. The context assistance server 140 can examine and attempt to match the uploaded sensor data with a pre-determined target event from a list of pre-determined target events. If an occurrence of a pre-determined target event is detected with a match, the context assistance server 140 can notify the mobile device 110 to continue monitoring its environment and reporting to the context assistance server 140 until the context assistance server 140 determines that the detected occurrence of the event has ended. The context assistance server 140 can also respond back to the mobile device 110 with information associated with the pre-determined target event that enables the mobile device 110 to continue monitoring its environment and to determine the end time of the occurrence without further assistance from the context assistance server 140.

To reduce power consumption, detection of occurrences of events may occur periodically, sporadically, or opportunistically, as opposed to continuously. For example, for detection of an occurrence of an event, the mobile device 110 may upload raw or processed sensor data to the context assistance server 140 only when the mobile device 110 has detected a change in location or audio environment.

Multiple sensor and component inputs may be combined to improve the accuracy of collected demographic statistics, such as by combining audio (e.g., microphone) data and location (e.g., GPS, Wi-Fi, or Bluetooth®) data when a user is at a movie theatre. For example, audio data and location data can be used to determine that the user is at a movie theatre. Then this information can be used (e.g., via an Internet search) to narrow down the set of possible movies to those movies playing at that cinema, at that time. Audio data can be used, again, to compute an exact movie match.

Detection of the occurrence of an event may also be used to update the demographic model of the user. For example, one of the categories of the user's demographic model may be sporting events attended, in which case any report relating to the attendance of pre-determined target sporting events can be used to update the value for this category. Feeding reports of event occurrences back into the demographic model can be useful for data mining applications where one wishes to assess the degree of correlation between certain events (e.g., the users that frequently watch television show X also frequently watch television show Y).

Permission, Privacy, and Anonymity

The user of the mobile device 110 can choose to opt-in and provide permission to allow any of the above actions to be performed. In some implementations, the collection of demographic statistics will occur in conjunction with a user-installed software application that provides a desired functionality, and the aforementioned permission will be requested and obtained from the user prior to their use of the application. For example, an application that provides navigation functionality may request permission to gather demographic information and to collect and report viewership and/or listenership statistics. Another example would be an application that provides speech recognition functionality, where permission could be requested from the user prior to sampling the user's audio. In some implementations, the context aware system 100 may run continuously on the mobile device 110 itself, rather than running as part of a user-installed software application as described above. In this case, permission could be obtained from the user, for example, when the mobile device 110 boots up for the first time.

The anonymity of the user may be maintained in various ways and to various degrees. Near one extreme, the actual value for each category of the demographic model can be reported to the context assistance server 140, except for the user's name. Near the other extreme, the value for each category of the demographic model can be quantized into a small number of bins. For example, if a home location category is used in the demographic model, at one extreme, this can be reported at the level of exact street address (i.e., the actual or raw value for the category), and at the other extreme, this can be reported at the level of the country (i.e., where the value bins are the countries). The user may be given the option to select a level of anonymity. Alternatively, or in addition, a default option for the level of anonymity may be automatically selected, but may be overwritten by the user's anonymity selection.

Associating with an Event Demographic Information of a User Participant

Figure 3:
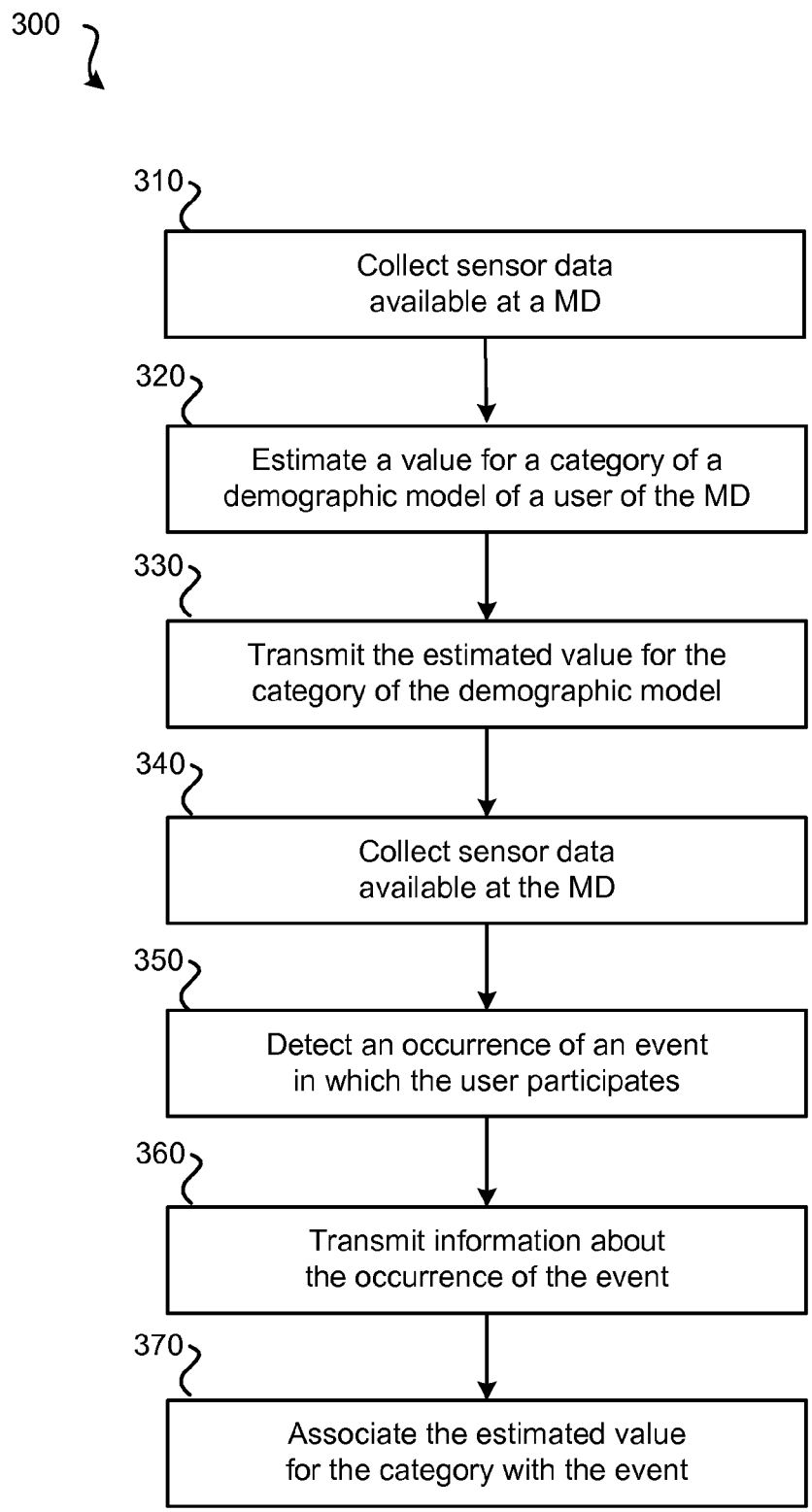
FIG. 3 is a block flow diagram of a process of associating with an event demographic information of a user who participates in the event.

Referring to FIG. 3, a process 300 of associating with an event demographic information of a user who participates in the event includes the stages shown. The process 300 is exemplary only and not limiting. The process 300 can be altered, e.g., by having stages added, removed, or rearranged. The process 300 is described in reference to an example instantiation of the above-described techniques for collecting demographic statistics using the microphone of a mobile device 110 and reporting occurrences of events of consuming (i.e., viewing or listening to) a pre-defined target media program.

At stage 310, sensor data available at a mobile device 110 are collected. In the example instantiation, the microphone of the mobile device 110 provides audio data, which are gathered. Typically, the best time to gather audio data is when the user is speaking in a phone call on the mobile device 110, as the signal-to-noise ratio of the audio will be high. However, the audio data can be gathered at any time during which the user is detected speaking.

At stage 320, a value for a category of a demographic model of the user of the mobile device 110 is estimated. In the example instantiation, the gathered audio data is used to gather demographic information by identifying acoustic properties of the user's speech. Known techniques exist for determining demographic information based on acoustic properties of the user's speech. Such demographic information for the user can include age, gender, languages spoken (i.e., primary language spoken, secondary language spoken, etc. . . . ), race, height, energy level, stress level, etc.

The microphone can gather the demographic information about the user while still maintaining the user's speech privacy. This can be achieved in a number of ways, for instance, by sampling audio very sparsely (e.g., 50 ms every 500 ms) so that the resultant audio stream has a lesser number of bits than is needed to reproduce the continuous audio stream with intelligible fidelity, or by pre-processing audio data (e.g., randomizing captured frames of audio data) such that speech cannot be reliably reconstructed from the resultant audio stream. Additional information related to privacy sensitive audio analysis can be found in U.S. Non-Provisional patent application Ser. No. 13/213,294, entitled "Preserving Audio Data Collection Privacy in Mobile Devices," filed Aug. 19, 2011, naming Leonard H. Grokop et al. (hereinafter "Grokop"), the entire contents of which are herein incorporated by reference for all purposes.

The first stage of determining acoustic properties of the user's speech is computing features of the speech. One feature that is relatively simple to compute and useful for gathering demographic information is pitch. Another popular feature is Mel-Frequency Cepstral Coefficients. Many other useful features can be computed. Once computed, the features can be used to estimate the values for the categories of the demographic model. For example, the pitch feature can be used to estimate the age and gender of the user, e.g., via a lookup table. Techniques that are more sophisticated may also be used.

At stage 330, the estimated value for the category of the demographic model is transmitted to the context assistance server 140. At appropriate times (e.g., during the night, or while the mobile device 110 is charging), either an update to the demographic model or the entire demographic model can be uploaded (e.g., through a wire or wirelessly) to the context assistance server 140.

At stage 340, sensor data available at the mobile device 110 are collected. The sensor data collected at stage 340 can be the same as or different from the sensor data collected at stage 310. Returning to the example instantiation, the mobile device 110 can again monitor its audio environment through the microphone. This can be performed while maintaining the user's speech privacy, for example, as described in Grokop.

At stage 350, an occurrence of an event in which the user participates is detected. In the example instantiation, an occurrence of the user viewing or listening to a pre-determined target media program is detected. There are numerous techniques for detecting the occurrence. This typically involves computing features of the audio waveform and comparing the computed features to features of pre-determined target media programs. For example, the mobile device 110 can transmit (e.g., via a wire or wirelessly) the computed audio features to the context assistance server 140. The context assistance server 140 can attempt to match the received computed audio features with features of pre-determined target media programs that are stored in a database accessible to the context assistance server 140. The context assistance server 140 can transmit information about a matched event back to the mobile device 110. If the target media program is a live event, the information needed to make a match may include, for example, a time, a date, and/or a location.

In some implementations, detection of the occurrence of the event occurs at the mobile device 110. For example, the mobile device 110 can gather the audio data, can compute the audio features, and can transmit the computed audio features to the context assistance server 140, as described above. However, instead of attempting to make a final match, the context assistance server 140 can identify multiple possible pre-determined target media programs, for example, based on the received computed audio features and possibly other information from the mobile device 110 (e.g., location information). The context assistance server 140 can then transmit (e.g., via a wire or wirelessly) to the mobile device 110 information about the multiple possible pre-determined target media programs to assist the mobile device 110 in making a final match of the particular pre-determined target media program that the user is consuming.

At stage 360, information about the occurrence of the event is transmitted to the context assistance server 140. The mobile device 110 can report the occurrence by transmitting (e.g., via a wire or wirelessly) the event details to the context assistance server 140. This can be done either immediately after the occurrence of the event is detected, or at a later time (e.g., during the night or while the mobile device 110 is charging). The report can include the categories of information shown in table 220 of FIG. 2, for example. In some implementations, one or more of the categories of information are determined by, and are not reported to, the context assistance server 140. For example, if the context assistance server 140 makes the final match, the event ID may be determined by the context assistance server 140.

At stage 370, the estimated value for the category is associated with the event. The information about the occurrence of the event transmitted at stage 360 can be used to associate the estimated value with the event. For the example instantiation, the estimated values for one or more of the age, gender, languages spoken, etc. of the user can be associated with the matched pre-determined target media program. Estimated values for the same and/or other categories of demographic models of other users who view or listen to the matched pre-determined target media program can also be associated with the media program. Over time, the gathered estimated values can provide demographic statistics related to the media program.

Generating Demographic Statistics Related to an Event

Figure 4:
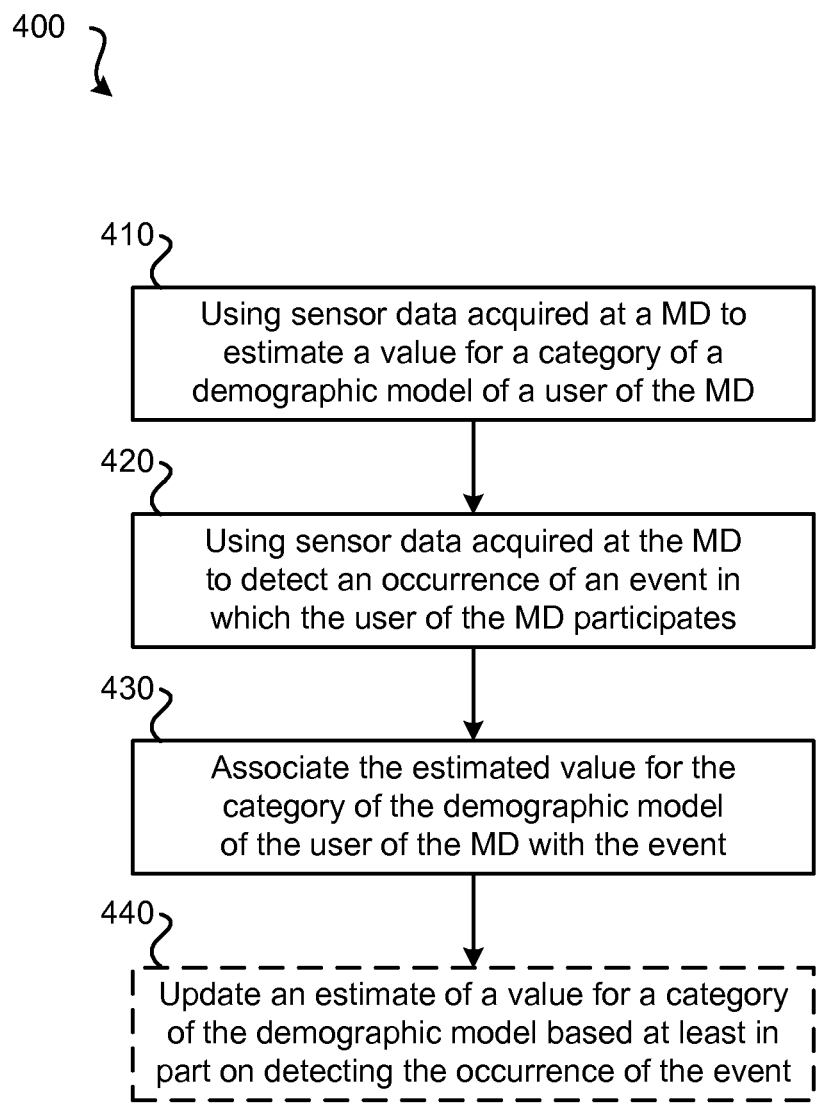
FIG. 4 is a block flow diagram of a process of generating demographic statistics related to an event, the occurrence of which is detected using sensor data available at a context-aware mobile device.

Referring to FIG. 4, a process 400 of generating demographic statistics related to an event includes the stages shown. The process 400 is exemplary only and not limiting. The process 400 can be altered, e.g., by having stages added, removed, or rearranged.

At stage 410, sensor data acquired at a mobile device 110 are used to estimate a value for a category of a demographic model of a user of the mobile device 110. In some scenarios, values for multiple categories of the demographic model are estimated using the sensor data. In some implementations, a confidence measure is assigned to the estimated value for the category. At stage 420, sensor data acquired at the mobile device 110 are used to detect an occurrence of an event in which the user of the mobile device 110 participates. The sensor data of stage 420 can be the same as or different from the sensor data of stage 410. At stage 430, the estimated value for the category of the demographic model of the user of the mobile device 110 is associated with the event. In some implementations, estimated values for more than one category (e.g., all the categories) of the demographic model of the user are associated with the event. Optionally, at stage 440, an estimate of a value for a category (e.g., the estimated value for the category at stage 410 or an estimated value for a different category) of the demographic model of the user is updated based at least in part on detecting the occurrence of the event. In some implementations, the process 400 is performed at a server in communication with the mobile device 110.

Figure 5:
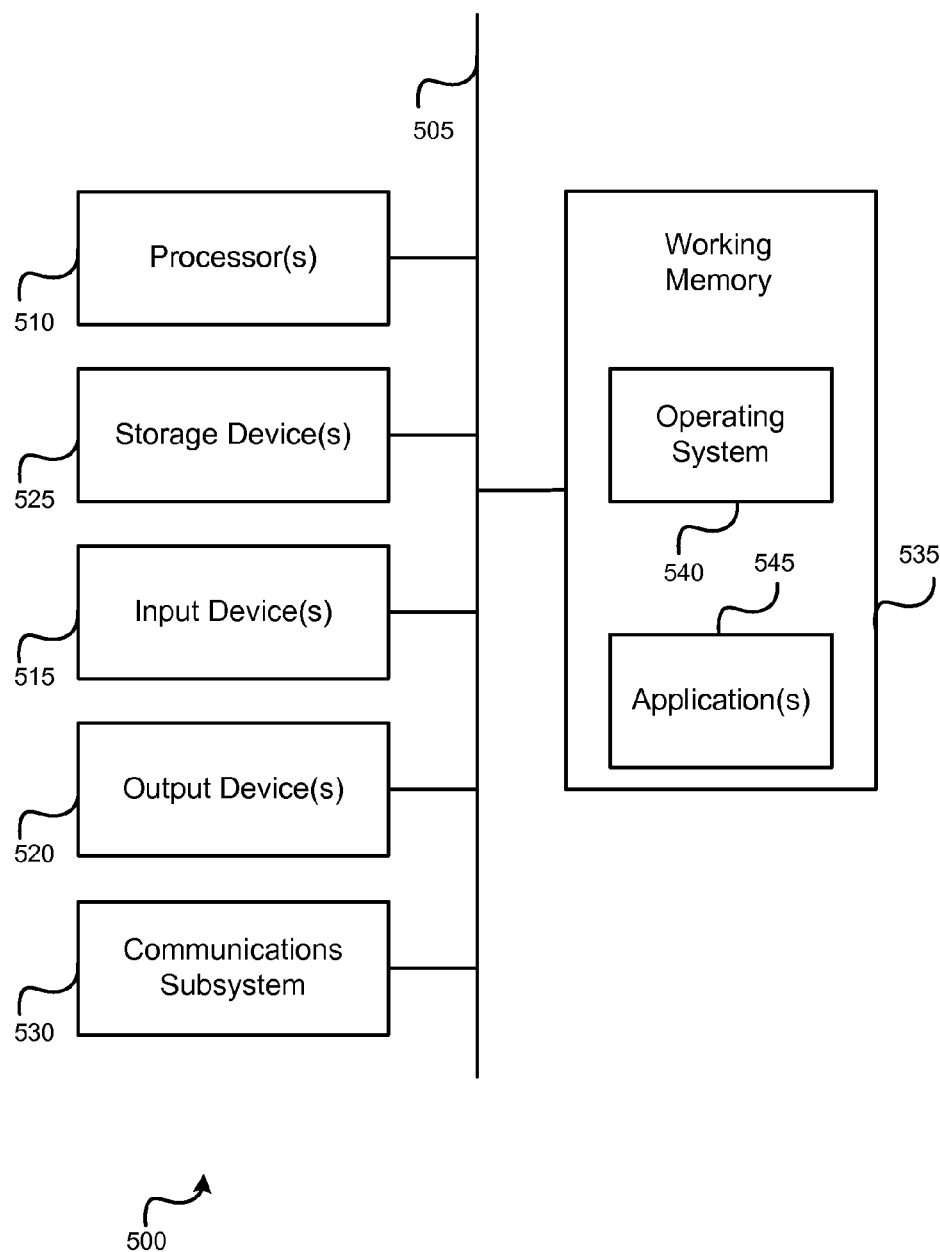
FIG. 5 is an illustration of a computer system that may be incorporated in one or more components of the context aware system of FIG. 1.

A computer system as illustrated in FIG. 5 may be incorporated as part of the previously described computerized devices. For example, computer system 500 can represent some of the components of the mobile devices and/or the remote computer systems discussed in this application. FIG. 5 provides a schematic illustration of one embodiment of a computer system 500 that can perform the methods provided by various other embodiments, as described herein, and/or can function as mobile device 110. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device and/or chipset (such as a Bluetooth® device, an 802.11 device, a Wi-Fi device, a WiMAX device, cellular communication facilities, etc.), and/or the like. The communications subsystem may permit data to be exchanged with a network (such as the network described below, to name one example), other computer systems, and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 525 described above. In some cases, the storage medium might be incorporated within a computer system, such as the computer system 500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer-readable medium," as used herein, refer to any medium that participates in providing data that causes a machine to operate in a specific fashion. Computer readable medium and storage medium do not refer to transitory propagating signals. In an embodiment implemented using the computer system 500, various computer-readable media might be involved in providing instructions/code to processor(s) 510 for execution and/or might be used to store such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, etc.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. A method of generating demographic statistics related to an event, the method comprising:
   estimating, using at least a first portion of sensor data acquired at a mobile device, one or more values for one or more categories of a demographic model of a user of the mobile device, wherein the estimated one or more values are determined in accordance with a user-selected level of anonymity and wherein the one or more estimated values comprise an estimated age of the user;
   detecting, using at least a second portion of the sensor data acquired at the mobile device, a change in a geographic location of the mobile device;
   determining, based on the change in the geographic location, an occurrence of the event in which the user of the mobile device participates;
   storing the estimated values for the user of the mobile device; and
   generating demographic statistics for the detected event, wherein the demographic statistics include the stored estimated values for the one or more categories of the demographic model for the user.

2. The method of claim 1, wherein the event comprises consuming a media program.

3. The method of claim 2, wherein the media program is a television program.

4. The method of claim 1, wherein the event comprises attending or participating in a live gathering of participants.

5. The method of claim 1, wherein the event comprises being present at a geographic location.

6. The method of claim 1, wherein the sensor data is acquired from one or more of a microphone, a GPS receiver, an accelerometer, a light sensor, a magnetometer, a gyroscope, a proximity sensor, a camera, a barometric pressure sensor, a temperature sensor, a capacitive touch sensor, a Wi-Fi detector, a Bluetooth® detector, or any combination thereof.

7. The method of claim 1, wherein at least one of estimation of the value and detection of the occurrence of the event also uses user content data including usage information from one or more of email content, calendar content, SMS text message content, social networks, a contact list, or any combination thereof.

8. The method of claim 1, wherein the one or more categories of the demographic model includes one or more of the following categories: age, gender, race, location, occupation, income, activity level, commute information, height, languages spoken, locations visited, environments encountered, or any combination thereof.

9. The method of claim 1, wherein estimating values for the one or more categories of the demographic model of the user of the mobile device further comprises assigning a confidence measure to at least one of the estimated values.

10. The method of claim 1, further comprising updating an estimate of a value for a category of the demographic model based at least in part on detecting the occurrence of the event.

11. The method of claim 1, wherein the method is performed at a server in communication with the mobile device.

12. A system for generating demographic statistics related to an event, the system comprising:
   a mobile device configured to:
      collect sensor data available at the mobile device;
      estimate, using at least a first portion of the sensor data, one or more values for one or more categories of a demographic model of a user of the mobile device, wherein the estimated values are determined in accordance with a user-selected level of anonymity and wherein the estimated values comprise an estimated age of the user;
      transmit the estimated values to a server;
      detect, using at least a second portion of the sensor data, a change in a geographic location of the mobile device;
      determine, based on the change in the geographic location, an occurrence of the event in which the user of the mobile device participates; and
      transmit information about the occurrence of the event to the server; and
   the server configured to:
      receive the estimated values from the mobile device;
      receive the information about the occurrence of the event from the mobile device;
      store the estimated values for the user of the mobile device; and
      generate demographic statistics for the detected event, wherein the demographic statistics include the stored estimated value of the category of the demographic model for the user.

13. The system of claim 12, wherein the event comprises consuming a media program.

14. The system of claim 13, wherein the media program is a television program.

15. The system of claim 12, wherein the event comprises attending or participating in a live gathering of participants.

16. The system of claim 12, wherein the event comprises being present at a geographic location.

17. The system of claim 12, wherein the mobile device is configured to acquire the sensor data from one or more sensors selected from the group consisting of: a microphone, a GPS receiver, an accelerometer, a light sensor, a magnetometer, a gyroscope, a proximity sensor, a camera, a barometric pressure sensor, a temperature sensor, a capacitive touch sensor, a Wi-Fi detector, and a Bluetooth® detector.

18. The system of claim 12, wherein
   the mobile device is further configured to acquire user content data including usage information from one or more of email content, calendar content, SMS text message content, social networks, a contact list, or any combination thereof; and
   at least one of estimation of the value and detection of the occurrence of the event also uses the user content data.

19. The system of claim 12, wherein the one or more categories of the demographic model includes one or more of the following categories: age, gender, race, location, occupation, income, activity level, commute information, height, languages spoken, locations visited, environments encountered, or any combination thereof.

20. The system of claim 12, wherein the mobile device is further configured to assign a confidence measure to at least one of the estimated values.

21. The system of claim 12, wherein the mobile device is further configured to update an estimate of a value for a category of the demographic model based at least in part on detecting the occurrence of the event.

22. A mobile device comprising:
one or more sensors configured to collect sensor data;
a processor communicatively coupled to the one or more sensors and configured to:
estimate, using at least a first portion of the sensor data collected by the one or more sensors, one or more values for one or more categories of a demographic model of a user of the mobile device, wherein the estimated values are determined in accordance with a user-selected level of anonymity and wherein the estimated values comprise an estimated age of the user,
detect, using a second portion of the sensor data, a change in a geographic location of the mobile device;
determining, based on the change in the geographic location, an occurrence of an event in which the user of the mobile device participates, wherein at least part of the second portion of the sensor data comprises audio data, and
process the audio data to generate audio features associated with the event; and
a transceiver communicatively coupled to the processor and configured to receive information about a plurality of possible pre-determined target events,
wherein the processor is further configured to detect the occurrence of the event in which the user of the mobile device participates by comparing the audio features associated with the event with the information about the plurality of possible pre-determined target events, and
wherein the transceiver is further configured to transmit the estimated values and to transmit information about the occurrence of the event.

23. The mobile device of claim 22, wherein
the event comprises consuming a media program;
the one or more sensors include a microphone; and
the audio features associated with the event are generated as features of an audio waveform of the media program collected using the microphone.

24. The mobile device of claim 22, wherein at least one of collecting the sensor data, estimating the one or more values, or detecting the occurrence of the event occurs periodically, sporadically, or opportunistically.

25. The mobile device of claim 22, wherein the one or more sensors include one or more sensors selected from the group consisting of: a microphone, a GPS receiver, an accelerometer, a light sensor, a magnetometer, a gyroscope, a proximity sensor, a camera, a barometric pressure sensor, a temperature sensor, a capacitive touch sensor, a Wi-Fi detector, and a Bluetooth® detector.

26. The mobile device of claim 22, further comprising one or more applications configured to provide user content data including usage information about the user of the mobile device for use in at least one of estimating the one or more values and detecting the occurrence of the event.

27. A server for utilizing a data network to generate demographic statistics related to an event, the server comprising:

a communication interface communicatively coupled with the data network and configured to receive, from a mobile device, one or more estimated values for one or more categories of a demographic model of a user of the mobile device, wherein the estimated values are determined in accordance with a user-selected level of anonymity and wherein the estimated values comprise an estimated age of the user, and to receive, from the mobile device, sensor data associated with a change in a geographic location of the mobile device to detect the event in which the user of the mobile device participates; and
a processor communicatively coupled with the communication interface and configured to:
detect an occurrence of the event by comparing the sensor data associated with the change in the geographic location of the mobile device with information about a plurality of pre-determined target events,
store the estimated values in association with the detected event, wherein the estimated values were estimated using the sensor data available at the mobile device, and
generate demographic statistics for the detected event, wherein the demographic statistics include the stored estimated.

28. The server of claim 27, further comprising a storage medium communicatively coupled with the processor and configured to store the information about the plurality of pre-determined target events.

29. The server of claim 27, wherein the processor is further configured to associate with the event estimated values for categories of demographic models of users of other mobile devices who participate in the event.

30. The server of claim 27, wherein
the communication interface is further configured to receive information about the occurrence of the event from the mobile device; and
the processor is configured to use the information about the occurrence of the event to associate the estimated values for the one or more categories of the demographic model of the user of the mobile device with the event.

31. The server of claim 27, wherein the communication interface is further configured to transmit the information about the plurality of pre-determined target events to the mobile device to assist the mobile device in detecting the occurrence of the event.

32. A computer program product residing on a non-transitory processor-readable medium and comprising processor-readable instructions configured to cause a processor to:
access one or more estimated values for one or more categories of a demographic model of a user of a mobile device, wherein the estimated values are determined in accordance with a user-selected level of anonymity and wherein the one or more estimated values comprise an estimated age of the user;
access sensor data associated with a change in a geographic location of the mobile device;
determine, based on the change in the geographic location of the mobile device, an event in which the user of the mobile device participates;
retrieve from storage information about a plurality of pre-determined target events;
detect an occurrence of the event by comparing the sensor data associated with the change in the geographic location of the mobile device with the information about the plurality of pre-determined target events;

store the estimated values in association with the detected event, wherein the estimated values were estimated using the sensor data available at the mobile device; and generate demographic statistics for the detected event, wherein the demographic statistics include the stored estimated values.

33. The computer program product of claim 32, wherein the processor-readable instructions are further configured to cause the processor to associate with the event estimated values for categories of demographic models of users of other mobile devices who participate in the event.

34. The computer program product of claim 32, wherein the processor-readable instructions are further configured to cause the processor to access information about the occurrence of the event from the mobile device and use the information about the occurrence of the event to associate the estimated values with the event.

35. The computer program product of claim 32, wherein the processor-readable instructions are further configured to cause the processor to provide to the mobile device the information about the plurality of pre-determined target events to assist the mobile device in detecting the occurrence of the event.

36. An apparatus for generating demographic statistics related to an event, the apparatus comprising:

means for receiving one or more estimated values for one or more categories of a demographic model of a user of a mobile device, wherein the estimated values are determined in accordance with a user-selected level of anonymity and wherein the one or more estimated values comprise an estimated age of the user, and for receiving sensor data associated with the event in which the user of the mobile device participates;

means for processing to detect a change in a geographic location of the mobile device to determine an occurrence of the event by comparing the sensor data associated with the change in the geographic location with information about a plurality of pre-determined target events, and to store the estimated values in association with the detected event, wherein the estimated values were estimated using the sensor data available at the mobile device; and means for generating demographic statistics for the detected event, wherein the demographic statistics include the stored estimated values.

37. The apparatus of claim 36, further comprising means for storing the information about the plurality of pre-determined target events.

38. The apparatus of claim 36, wherein the means for processing are further to associate with the event estimated values for categories of demographic models of users of other mobile devices who participate in the event.

39. The apparatus of claim 36, wherein the means for receiving are further for receiving information about the occurrence of the event from the mobile device; and the means for processing are further to use the information about the occurrence of the event to associate the estimated values with the event.

40. The apparatus of claim 36, further comprising means for transmitting the information about the plurality of pre-determined target events to the mobile device to assist the mobile device in detecting the occurrence of the event.

* * * * *